Figure 1:
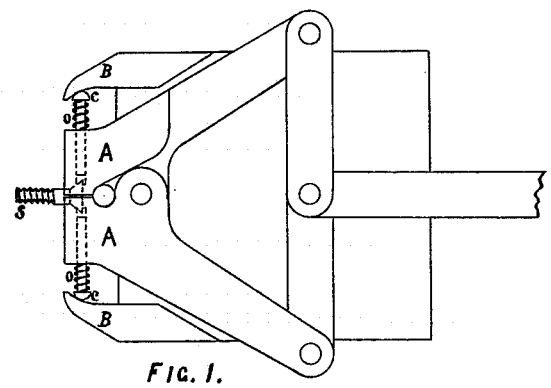

J. A. SHELDON.
SCREW-THREADING MACHINE.

No. 189,661.                    Patented April 17, 1877.

Witnesses.                    Inventor.
H. P. Sheldon                 Jeremiah A. Sheldon
Walter B. Vincent

UNITED STATES PATENT OFFICE.

JEREMIAH A. SHELDON, OF PROVIDENCE, RHODE ISLAND.

IMPROVEMENT IN SCREW-THREADING MACHINES.

Specification forming part of Letters Patent No. 189,661, dated April 17, 1877; application filed March 12, 1877.

*To all whom it may concern:*

Be it known that I, JEREMIAH A. SHELDON, of Providence, in the State of Rhode Island, have made certain new and useful Improvements in Machines for Theading Screws; and I do hereby declare that the following specification, taken in connection with the drawing making a part of the same, is a full, clear, and exact description thereof.

Figure 2:
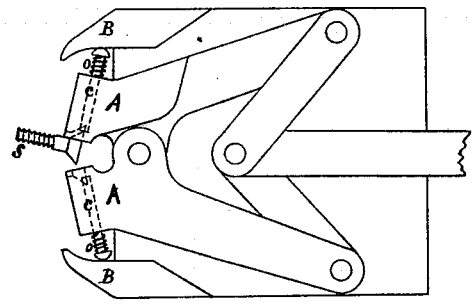

Figure 1 is a view of the clamping-jaws closed upon the screw. Fig. 2 is a view of the same open, showing manner of discharging the screw.

The object of my invention is to provide an effective means for discharging the finished screw from the holding or clamping jaws which hold it during the time it is being threaded; and consists in the arrangement and operation of the punches, as hereinafter described.

In the drawing, A A, Figs. 1 and 2, are the ordinary jaws or clamps which hold the screw S while it is being threaded, and are provided with suitable recesses upon their faces to secure the same. C C, Figs. 1 and 2, are two punches passing through the jaws A A. B B are two projections attached to the mandrel, in which the jaws are mounted, or to any other convenient part of the machine. The faces of the projections B B are shaped with reference to the direction in which the jaws A A move.

Commencing with the parts in the position shown in Fig. 1, the operation of my invention is as follows: The jaws A A open to release the screw, as shown in Fig. 2, and, as they separate, the punches C C, being in contact with the projections B B, will be forced inward, so that they will strike and throw out the screw, which may be left sticking in either jaw.

O O are spiral springs, which serve to withdraw the punches C C as the jaws A A close upon a new screw-blank, although the same may be forced back without the spring by coming in contact with the screw-blank itself.

What I claim as my invention, and desire to secure by Letters Patent, is—

The combination, in a screw-threading machine, of the griping-jaws A A, cam-faced projections B B, and the punches C C, provided with retracting-springs O, the whole arranged and operating in the manner substantially as described, for the purposes specified.

JEREMIAH A. SHELDON.

Witnesses:
F. P. SHELDON,
WALTER B. VINCENT.